Dec. 29, 1925.
W. F. LOHFF
1,567,156
SAFETY BANK CHECK
Filed Dec. 20, 1924
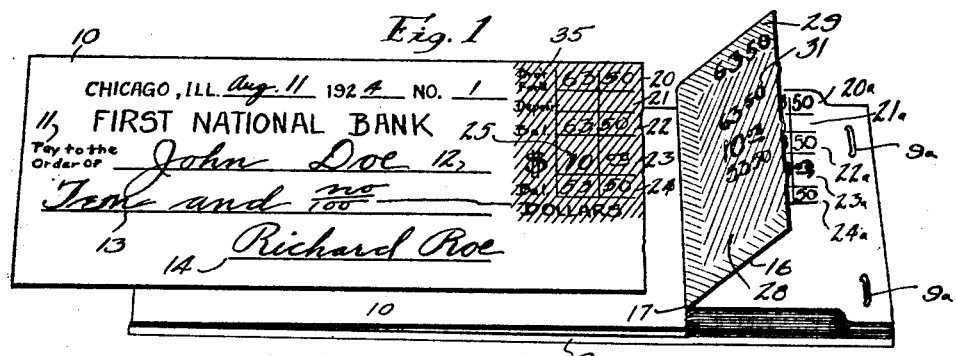
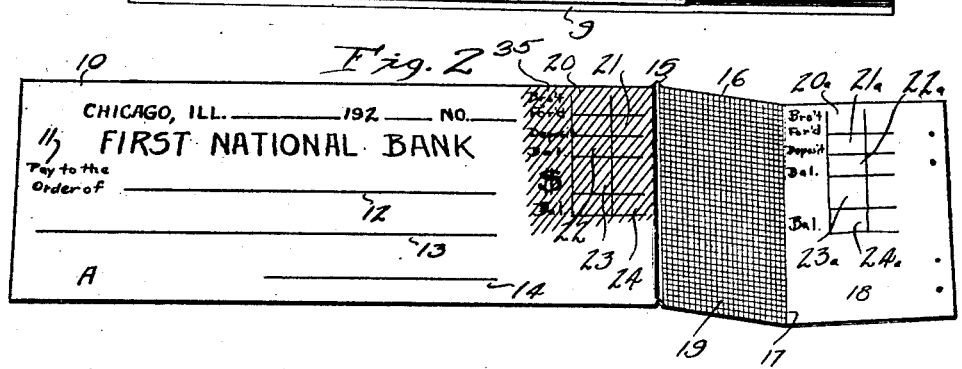
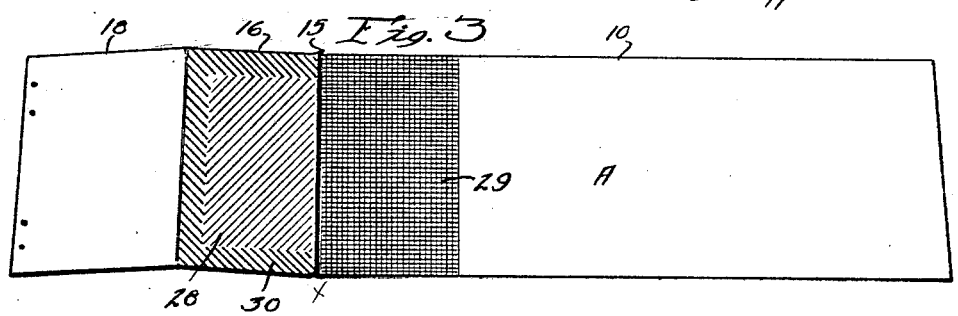
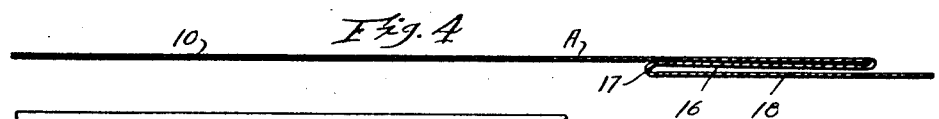
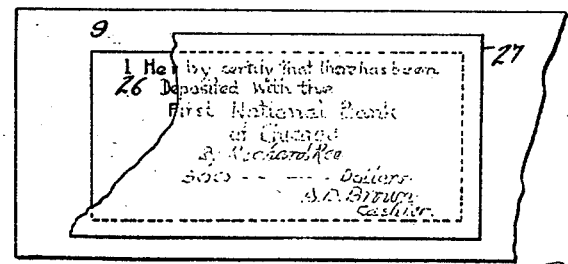

Patented Dec. 29, 1925.

1,567,156

UNITED STATES PATENT OFFICE.

WILLIAM F. LOHFF, OF HOLSTEIN, IOWA.

SAFETY BANK CHECK.

Application filed December 20, 1924. Serial No. 757,139.

*To all whom it may concern:*

Be it known that I, WILLIAM F. LOHFF, a citizen of the United States, and a resident of Holstein, in the county of Ida and State of Iowa, have invented certain new and useful Improvements in Safety Bank Checks, of which the following is a specification.

My invention relates to an improvement in the ordinary negotiable bank check, and it is my object to provide a check by which the payee or acceptor of the check may be assured that there are sufficient funds in the bank to cover the check.

Further, my invention contemplates the use of a check book having sealed therein a deposit slip certified by the bank in which funds to be drawn by the check are deposited, and in which the amounts drawn by subsequent checks and the remaining balance are automatically registered and protected from being rendered false by the owner of the check book in order that the payee of a check may ascertain the true balance of the account.

More specifically it is my object to provide a check having a space in which the amount drawn by the check must be written, together with the balance remaining in the bank, in order to render the check negotiable, the ordinary balance-indicating stub of the check being positioned beneath that portion of the body of the check on which the aforesaid space is provided, in order that the writing of the amount of the check and the balance in said space may be transmitted by a suitable duplicating medium disposed, between the body of the check and the stub, to the stub.

A still further object is to provide means for preventing or for detecting the producing of a false balance upon the stub by writing upon the check body with an instrument which does not ordinarily leave a visible mark.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a perspective view of a check book embodying my invention, several of the checks being removed, and one of the removed checks being shown adjacent its corresponding stub.

Fig. 2 is a perspective view of one of the blank checks with the attached stub, removed from the check book.

Fig. 3 is a rear view of the same.

Fig. 4 is a longitudinal sectional view of the same, and

Fig. 5 is a plan view of the check book cover showing the sealed in certificate of deposit.

I have used the reference character, 9, to indicate generally the cardboard back of a check book, to which is attached, by means of staples, 9ª, the check blanks, A. Each of the blanks, A, comprises a check body, 10, having the ordinary words of negotiability, 11, thereon, together with a space, 12, for the name of the payee, a space, 13, for the written amount drawn by the check, and a space, 14, for the signature of the drawer.

At the right end of the check body, 10, the blank, A, is scored, as at 15, and thence the portion, 16, is bent back and under the end of the check body, 10, as illustrated in Fig. 4. At 17 the blank, A, is again bent in the opposite direction to form the balance-receiving stub, 18, the end of which is secured to the back, 9. The intermediate portion, 16, is provided on what is the under face, when it is in normal folded position, with a heavy coating of carbon, 19, indicated in Fig. 2 by the conventional shading for black.

At the end of the check body, 10, and on the upper face of the check stub, 18, are corresponding columns, 20, 21, 22, 23 and 24, and 20ª, 21ª, 22ª, 23ª and 24ª, respectively. The respective like numbered columns are positioned to register one above the other when the check body, A, is in normal position, superimposed upon the check stub. The column, 23, is aligned with the space, 12, and adapted to receive the figure, 25, indicating the amount drawn by the check. The column, 24, receives the balance of the account after subtracting the amount of the check. Columns 20, 21 and 22 receive, respectively, characters indicative of the amounts brought forward from the preceding balance, the amount deposited, if any, and the sum of the preceding two columns, respectively, as in the ordinary check stub.

It will now be seen that when a check is filled out properly, the writing of the figures in the columns, 23 and 24, will transmit to the columns, 23ª and 24ª, a carbon impression of these figures.

In order that the merchant may check the balance of the account to assure himself of its accuracy the check book back, 9, is provided with a pocket, 27, of transparent material, under which is sealed a certificate of deposit, 26, indicating the amount originally deposited by the owner of the check book. The slip is certified by the cashier of the bank, and subsequent deposits made by the depositor may be certified by the signature of the same official in the column, 21.

It will now be seen that if a merchant should hesitate to accept the check of a stranger, he may check the balance of the stranger's account by going through the various stubs remaining in the check book to ascertain that no mistake has been made in subtracting the various sums from the original amount deposited.

In order to prevent the removal of the check body from the check book before writing the amounts in the columns, 24 and 25, and producing a false balance on a check stub by inserting a piece of waste paper in place of the check body, I provide a coating, 28, of extremely rapid, light-sensitive material on that face of the intermediate portion, 16, which normally adjoins the check body, 10. The rear face of the check body, 10, is provided with a heavy coating of carbon, 29, to register with the intermediate portion, 16. The coatings, 19 and 29, are both of sufficient weight to absolutely exclude light from the light-sensitive material, 28, when the portion, 16, is in intimate contact with the back of the check body. A coating of mucilage or suitable gum, 30, borders the area covered by the light-sensitive material, 28, and serves to secure the portion, 16, against the rear face of the check body, 10. In preparing the check blanks, it will be understood that the operations are conducted under a colored light which does not affect the material, 28, the blanks being sealed, as shown in Fig. 4, prior to their binding together in the form shown in Fig. 1.

When a character is written in one of the columns, 23 or 24, the carbon impression is superimposed over the film of light-sensitive material, 28, as indicated at 31. After writing the check it is removed by simply drawing it away from the stub portion of the check book so as to loosen the sealed connection between the intermediate portion, 16, and the check body, and is then severed along the line, 15. Upon contact with the atmosphere the area covered by the material, 28, will be discolored. Should the maker of the check attempt to produce a false balance upon the stub by removing the check and replacing it by an ordinary piece of carbon paper covering the face, 28, a carbon impression could be produced. However, by removing a portion of this carbon impression from the face of the intermediate section, 16, it would be discovered that the surface of the paper underlying the carbon impression was discolored, as well as the surrounding area. Should the accepter of the check suspect the maker, he may test the various check stubs by removing a small portion of the carbon impression, 31, by means of an ordinary rubber eraser, and if he finds the surface underlying the impression to have been unaffected previously thereto by light, he may be assured that the impression was created by the carbon from the back of the check body, 10, before severing from the check stub. By comparing the figures, 31, with the carbon figures on the stub itself, the merchant may satisfy himself that the maker of the previous check did not insert a sheet of paper between the intermediate portion, 16, and the check stub, 18.

In order to prevent the possibility of using a stylus to create the impression, 31, and the second carbon on the stub and then detaching the check body and inserting a different balance, the upper face of the check body may be coated with a pigment material which is easily removed by the pressure of the writing instrument.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In a device of the class described, a check body having an appropriately designated column in which the amount of the sum ordered by the check, and the balance of deposit, must be written, in order to render the check negotiable, a balance indicating stub underlying that portion of the check body which contains said column, and means for transmitting to the stub an impression of the characters written in said column, said stub being sealed at its edges to the under surface of the check body, a second balance-indicating stub underlying said first mentioned stub, and means for transmitting a second duplicate impression of said characters to said second stub.

2. In a device of the class described, a check body having an appropriately designated column in which the amount of the sum ordered by the check and the balance of deposit must be written in order to render the check negotiable, a first balance-indicating stub formed of a continuation of said check body, folded under that portion of the check body which contains said column, means for transmitting to said first stub an impression of the characters written in said column, a second balance-indicating stub formed of a continuation of said first balance-indicating stub, folded back under said first balance-indicating stub, and means for transmitting a second duplicate impression of said characters to said second stub.

3. In a device of the class described, a check body having at one end an appropriately designated column in which the amount of the sum ordered by the check, and the balance of deposit, must be written in order to render the check negotiable, a balance indicating stub normally underlying that portion of the check body having said column, means for transmitting to the stub an impression of indicia written in said column, and means disposed between the body and the stub, for recording a duplicate impression of said indicia of a certain character, said means being sealed from the atmosphere, and adapted to be rendered inoperative when unsealed, to the extent of preventing the recording of an impression of said character.

4. In a device of the class described, a check body having a column in which the amount of the sum ordered by the check, and the balance of deposit, must be written, in order to render the check negotiable, a balance indicating stub underlying that portion of the check body which contains said column, and means for transmitting to the stub an impression of the characters written in said column, that portion of the face of the check body which contains said column being provided with a coating of colored substance removable by contact with a writing instrument impressed thereagainst in the act of writing.

Signed at Holstein, in the county of Ida and State of Iowa, this 12th day of December, 1924.

WILLIAM F. LOHFF.